V. E. CAMPBELL.
SPRING WHEEL.
APPLICATION FILED SEPT. 12, 1911.
1,029,789.
Patented June 18, 1912.
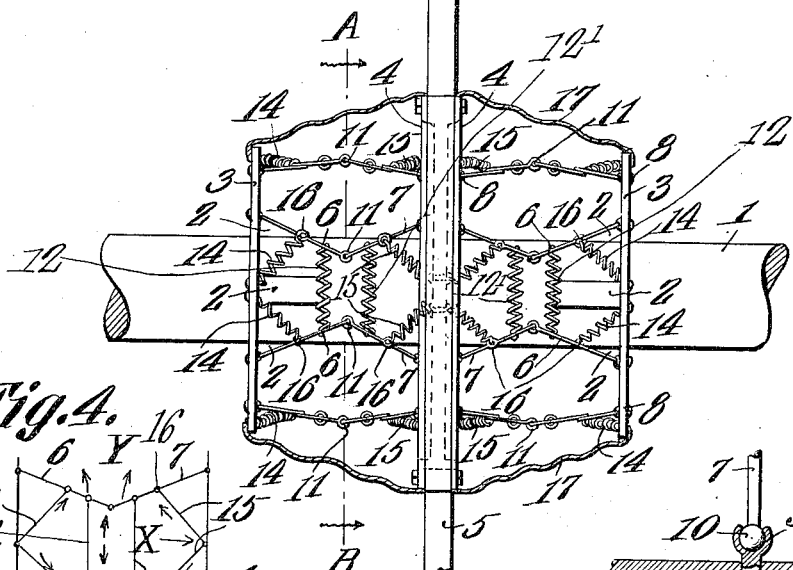
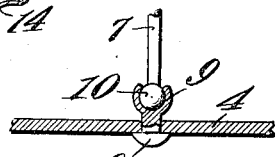
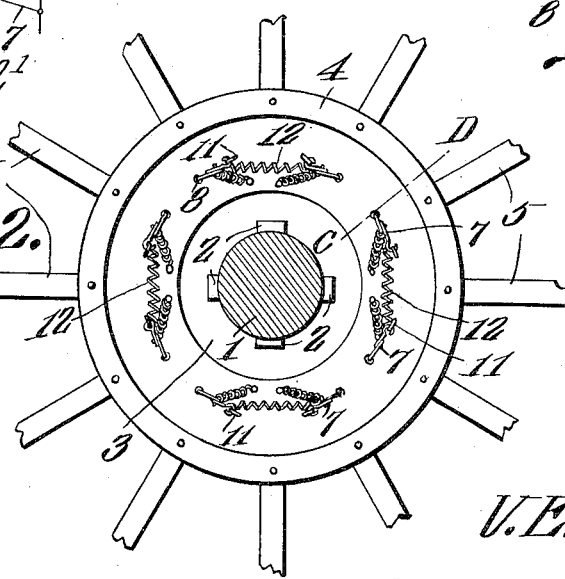
Witnesses
V. E. Campbell,
Inventor
by C. A. Snow & Co.
Attorneys

UNITED STATES PATENT OFFICE.

VICTOR E. CAMPBELL, OF BERKELEY, CALIFORNIA.

SPRING-WHEEL.

1,029,789.   Specification of Letters Patent.   Patented June 18, 1912.

Application filed September 12, 1911. Serial No. 648,940.

*To all whom it may concern:*

Be it known that I, VICTOR E. CAMPBELL, a citizen of the United States, residing at Berkeley, in the county of Alameda and State of California, have invented a new and useful Spring-Wheel, of which the following is a specification.

It is the object of this invention to provide a spring wheel of novel and improved form, so constructed that the spoke holding portion of the wheel will be yieldably connected with the axle thereof, for movement in a plane at right angles to the axle, the spoke holding portion of the wheel being permitted to have a slight lateral movement, which lateral movement is limited and restricted by a peculiar and novel arrangement of co-acting springs and links.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in sectional elevation; Fig. 2 is a section on the line A—B of Fig. 1; Fig. 3 is a section on the line C—D of Fig. 2; and Fig. 4 is a graphic figure, explanatory of the movements of the links and of the springs.

In the drawings, the numeral 1 denotes the axle of a vehicle, to which abutment blocks 2 may be secured, hub plates 3 surrounding the axle 1, and abutting against the blocks 2, the hub plates 3 being secured to the axle 1, for rotation therewith. The invention further includes a spoke holder 4, preferably of annular form, the spoke holder 4 receiving the spokes 5. The spoke holder 4 is spaced from the axle 1, so as to have movement in a plane perpendicular to the axle. The spoke holder 4 is connected with the hub plates 3 by a plurality of link and spring mechanisms, these sets of link and spring mechanisms being multiplied to any desired extent. But one of them will be described, since they are alike.

Pivotally connected with the hub plates 3, are a pair of primary links 6, which converge toward the plane of the wheel. A pair of secondary links 7 are pivotally connected with the spoke holder 4, the links 7 converging away from the plane of the wheel. A variety of devices may be employed for pivotally connecting the remote ends of the links 6 and 7 with the hub plates 3, and with the spoke holder 4, respectively. One form of connection is shown in detail in Fig. 3, as applied specifically to the connection between one of the secondary links 7 and the spoke holder 4. If desired, a connecting element 8 may be extended through the spoke holder 4, the connecting element having in its end, a socket 9, adapted to receive a ball head 10, fashioned on the end of the secondary link 7. Fig. 3 serves to illustrate, with equal propriety, one means whereby the primary links 6 may be connected with the hub plates 3.

The inner, adjacent ends of the links 6 and 7 are united by connections, the same preferably taking the form of rings 11. The primary links 6 are united by primary retractile springs 12 and the secondary links 7 are united by the similar springs 12', the springs 12 and 12' being located on opposite sides of the connecting rings 11. Auxiliary springs 14 unite the intermediate portions of the primary links 6 with the hub plates 3. These auxiliary springs 14 converge from their points of union with the primary links 6, toward the hub plates 3, to which their outer ends are secured. The auxiliary springs 14 are preferably of the helical type, and are retractile elements.

Supplemental springs 15 are secured to the intermediate portions of the secondary links 7, the supplemental springs 15 converging from their points of attachment to the secondary links, toward the spoke holder 4, to which the supplemental springs 15 are attached. The supplemental springs 15 are retractile in operation, and like the other springs hereinbefore mentioned, are preferably, although not necessarily, of helical form. In attaching the ends of the springs 14 and 15 to the links 6 and 7, respectively, eyes 16 may be fashioned in the links; although any other equivalent structures may be employed.

A flexible cover 17 extends from the spoke holder 4, to the hub plates 3, so as to house in the link and spring mechanisms. Upon the outer ends of the spokes 5, a tire 18 is shown. The tire 18 constitutes no part of the present invention, and may be of any form.

It will be seen that the links 6 and 7, together with the springs 12, 12', 14 and 15, serve to support the spoke holder 4 yieldingly, so that the same may have movement in a vertical plane, relative to the axle 1. Thus, all jolts and jars will be absorbed readily. The spoke holder 4 will likewise have a slight lateral movement with respect to the axle 1, but it is to be observed that this lateral movement is but small, the same being restricted to the amount required in order to give the wheel sufficient resiliency. Let Fig. 4 of the drawings be noted, and suppose that a lateral pressure were applied to the spoke holder 4, in the direction of the arrow X of Fig. 4. Under such circumstances, the connected ends of the links 6 and 7 will swing outwardly in the direction of the arrows Y. This operation will serve to put the springs 12, 12', 14 and 15 under tension, as indicated by the arrows which are located adjacent the said springs. At the beginning of the pressure denoted by the arrow X, the links 6 and 7 will move somewhat readily, thereby affording the desired resiliency, but, as the movement of the links 6 and 7 increases, the tension of the springs 12, 12', 15 and 14, will be increased, in a ratio out of all proportion to the movement of the links 6 and 7, thereby preventing an undue lateral movement or "wabbling" of the spoke holder 4 and the spokes 5. It has been pointed out that when the spoke holder 4 moves in the direction of the arrow X, the springs 12, 12', 14 and 15 will be put under tension. The foregoing applies to one side of the wheel only, it being easily discernible that the springs upon the other side of the wheel will be put under compression; the springs upon opposite sides of the spoke holder 4 thus co-acting to maintain the spoke holder 4 properly positioned and to preserve a resilient supporting of the spoke holder.

Having thus described the invention, what is claimed is:—

1. In a device of the class described, an axle; a spoke holder surrounding and spaced from the axle; a set of secondary links pivoted to the spoke-holder; a set of primary links; means for connecting the primary links with the axle; connections between the adjacent ends of the primary and secondary links; and a spring uniting the links of one set.

2. In a device of the class described, an axle; a spoke holder surrounding and spaced from the axle; secondary links pivoted to the spoke-holder; primary links; means for connecting the primary links with the axle; connections between the adjacent ends of the primary and secondary links; springs uniting the intermediate portions of the primary links with said means; and springs uniting the intermediate portions of the secondary links with the spoke holder.

3. In a device of the class described, an axle; a spoke holder surrounding and spaced from the axle; a set of secondary links pivoted to the spoke holder; a set of primary links; means for connecting the primary links with the axle; connections between the adjacent ends of the primary and secondary links; a spring uniting the links of one set; springs uniting the intermediate portions of the primary links with said means; and springs uniting the intermediate portions of the secondary links with the spoke holder.

4. A device of the class described comprising an axle; spaced hub plates secured to the axle; a spoke holder surrounding the axle and spaced therefrom; a set of converging primary links connected with the hub plates; a set of converging secondary links connected with the spoke holder; connections between the ends of the primary and secondary links; retractile springs uniting the links of both sets; retractile springs united with the intermediate portions of the secondary links, said springs converging toward the spoke holder, and being connected therewith; and retractile springs connected with the intermediate portions of the primary links, said springs converging toward the plates, and being connected therewith.

In testimony that I claim the foregoing as my own, I have hereto affixed my signature in the presence of two witnesses.

VICTOR E. CAMPBELL.

Witnesses:
F. S. WILSON,
IRENE SAGER.